(12) United States Patent
Chen

(10) Patent No.: US 12,449,636 B2
(45) Date of Patent: Oct. 21, 2025

(54) LENS ASSEMBLY

(71) Applicants: Sintai Optical (Shenzhen) Co., Ltd., ShenZhen (CN); Asia Optical Co., Inc., Taichung (TW)

(72) Inventor: Ming-Chung Chen, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 438 days.

(21) Appl. No.: 18/145,918

(22) Filed: Dec. 23, 2022

(65) Prior Publication Data

US 2023/0375813 A1    Nov. 23, 2023

(30) Foreign Application Priority Data

May 19, 2022    (CN) .................... 202210543496.1

(51) Int. Cl.
| | |
|---|---|
| G02B 9/64 | (2006.01) |
| G02B 13/00 | (2006.01) |
| G02B 15/14 | (2006.01) |
| G02B 27/00 | (2006.01) |
| G02B 27/64 | (2006.01) |

(52) U.S. Cl.
CPC ............ *G02B 9/64* (2013.01); *G02B 13/0045* (2013.01); *G02B 15/1431* (2019.08); *G02B 27/0025* (2013.01); *G02B 27/646* (2013.01)

(58) Field of Classification Search
CPC .... G02B 15/143101; G02B 15/144101; G02B 15/145101; G02B 15/145117; G02B 15/145125
See application file for complete search history.

(56) References Cited

U.S. PATENT DOCUMENTS

| | | | |
|---|---|---|---|
| 6,928,926 B2 | 8/2005 | Koifman et al. | |
| 8,824,057 B2 | 9/2014 | Ryu | |
| 2016/0291291 A1* | 10/2016 | Omori | G02B 27/0025 |
| 2018/0074300 A1* | 3/2018 | Gyoda | G02B 15/177 |
| 2019/0056573 A1 | 2/2019 | Masugi | |
| 2020/0341248 A1* | 10/2020 | Iwamoto | G02B 15/143103 |

(Continued)

FOREIGN PATENT DOCUMENTS

| | | |
|---|---|---|
| CN | 103389571 A | 11/2013 |
| JP | S5988715 A | 5/1984 |
| JP | H0527164 | 2/1993 |

(Continued)

*Primary Examiner* — Darryl J Collins
(74) *Attorney, Agent, or Firm* — McClure, Qualey & Rodack, LLP

(57) ABSTRACT

A lens assembly includes a first lens group, a second lens group, and a third lens group, all of which are arranged in order from an object side to an image side along an optical axis. The first lens group is with positive refractive power and includes at least four lenses, among which the lens closest to the object side includes a convex surface facing the object side, and the lens closest to the image side includes a convex surface facing the image side. The second lens group is with negative refractive power and includes a 2-1 lens and a 2-2 lens, wherein the 2-2 lens includes a convex surface facing the image side. The third lens group is with negative refractive power and includes a 3-1 lens, wherein the 3-1 lens is a meniscus lens with negative refractive power.

20 Claims, 15 Drawing Sheets

(56) References Cited

U.S. PATENT DOCUMENTS

2021/0041665 A1* 2/2021 Iwamoto ............ G02B 13/0035
2022/0269057 A1* 8/2022 Hori .................. G02B 15/1461

FOREIGN PATENT DOCUMENTS

| | | | |
|---|---|---|---|
| JP | H10133102 | A | 5/1998 |
| JP | 2000028919 | A | 1/2000 |
| JP | 2004004698 | A | 1/2004 |
| JP | 2015163926 | A | 9/2015 |
| JP | 2017015909 | A | 1/2017 |
| JP | 2017219645 | A | 12/2017 |
| JP | 2019191502 | A | 10/2019 |
| JP | 2020071438 | A | 5/2020 |
| JP | 2020109436 | A | 7/2020 |
| JP | 2021021900 | A | 2/2021 |
| JP | 2022017155 | A | 1/2022 |
| TW | 201115182 | A | 5/2011 |
| WO | 2016017727 | A1 | 2/2016 |

* cited by examiner

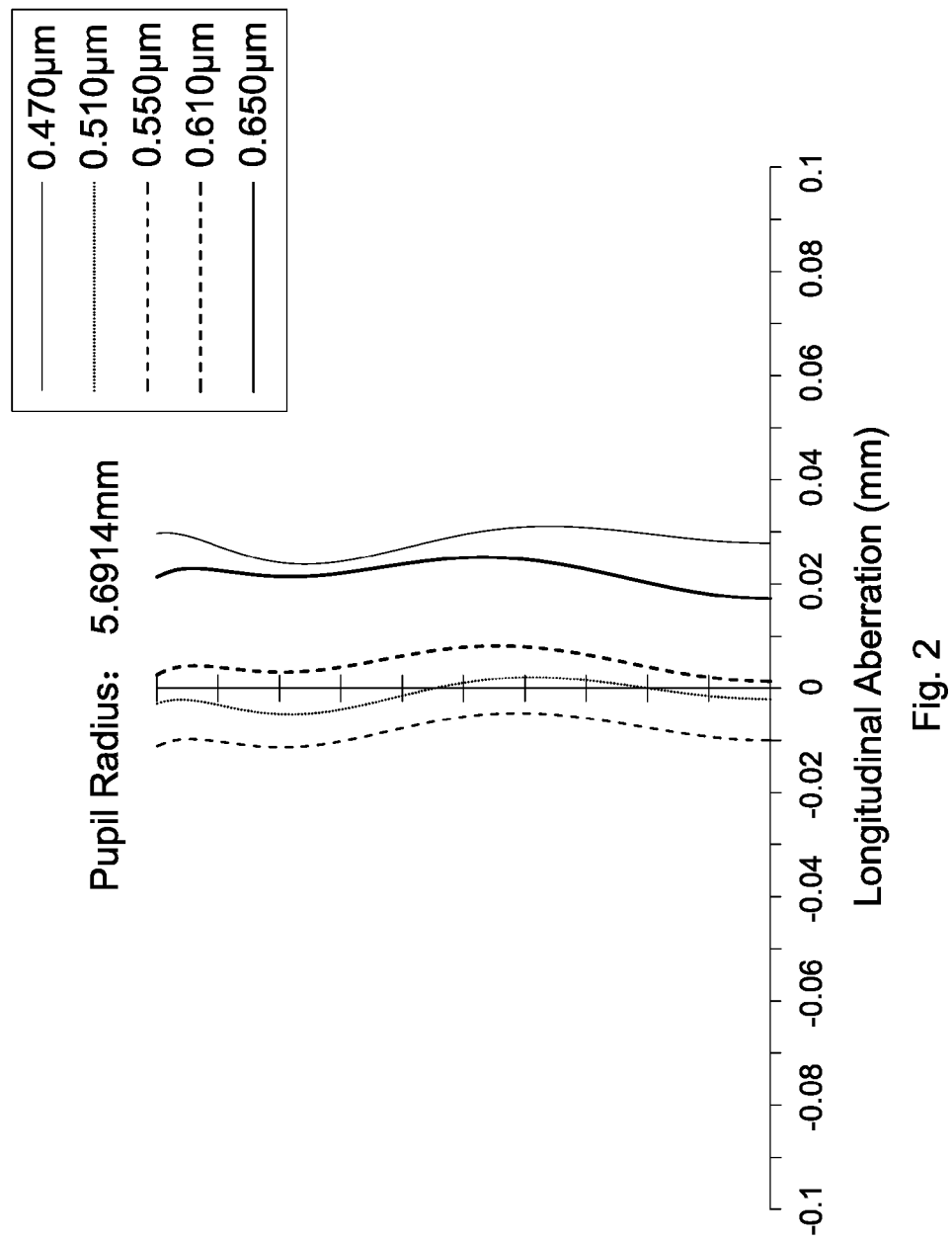

Transverse Ray Fan Plot

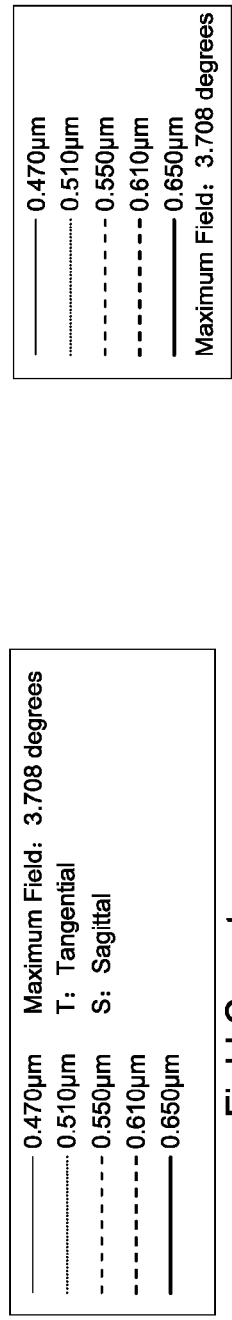
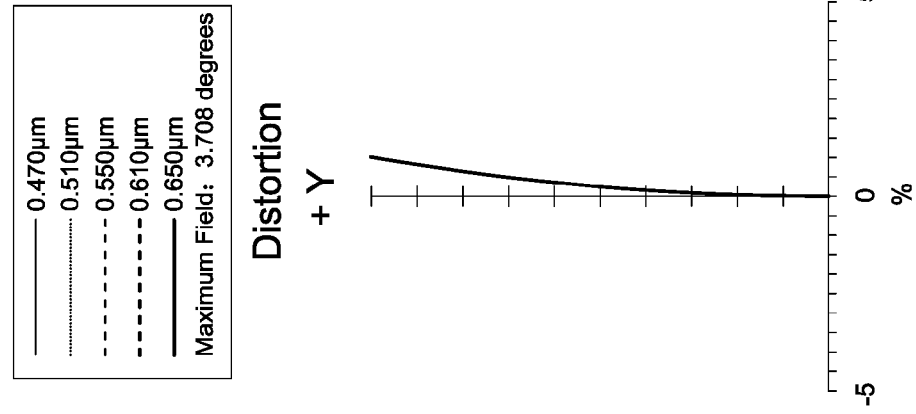
Fig. 9
Fig. 10

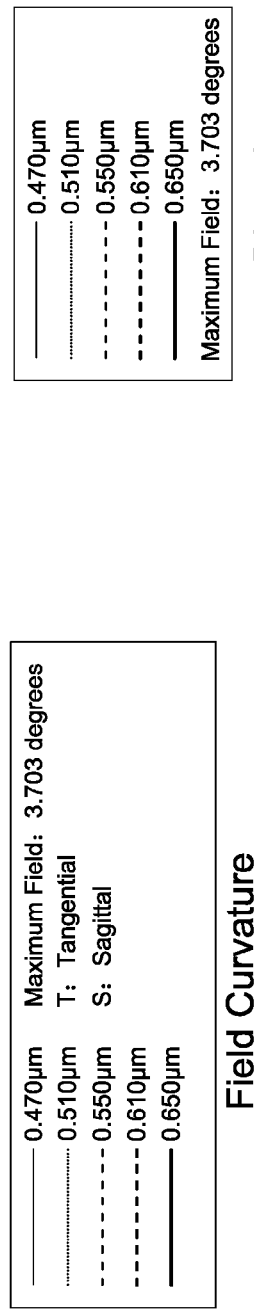
Fig. 15
Fig. 16

Transverse Ray Fan Plot

LENS ASSEMBLY

BACKGROUND OF THE INVENTION

Field of the Invention

The invention relates to a lens assembly.

Description of the Related Art

The traditional long focal length lens assembly usually has a longer total lens length, and as the focal length becomes larger, the total lens length is longer and the shake will have a greater impact on the image quality. Therefore, it is necessary to have an optical image stabilization to effectively eliminate shaking and improve image quality. The traditional long focal length lens assembly usually does not have an optical image stabilization, a short total lens with long focal length, and cannot meet today's requirement. Therefore, the lens assembly needs a new structure in order to meet the requirements of long focal length, miniaturization, high resolution, and optical image stabilization.

BRIEF SUMMARY OF THE INVENTION

The invention provides a lens assembly to solve the above problems. The lens assembly of the invention is provided with characteristics of a decreased total lens length, an increased resolution, an optical image stabilization, and still has a good optical performance.

The lens assembly in accordance with an exemplary embodiment of the invention includes a first lens group, a second lens group, and a third lens group, all of which are arranged in order from an object side to an image side along an optical axis. The first lens group is with positive refractive power and includes at least four lenses arranged in order from the object side to the image side along the optical axis, among which the lens closest to the object side includes a convex surface facing the object side, and the lens closest to the image side includes a convex surface facing the image side. The second lens group is with negative refractive power and includes a 2-1 lens and a 2-2 lens, wherein the 2-2 lens includes a convex surface facing the image side. The third lens group is with negative refractive power and includes a 3-1 lens, wherein the 3-1 lens is a meniscus lens with negative refractive power. The 2-1 lens and the 2-2 lens are arranged in order from the object side to the image side along the optical axis.

In another exemplary embodiment, the second lens group can move along the direction perpendicular to the optical axis to achieve optical image stabilization; and the third lens group can move along the optical axis for focusing.

In yet another exemplary embodiment, at least three of the lenses of the first lens group are with positive refractive power; the refractive power of the 2-1 lens is opposite to the refractive power of the 2-2 lens; and at least one of the 2-1 lens and the 2-2 lens of the second lens group is a meniscus lens when at least two of the lenses of the first lens group are meniscus lenses.

In another exemplary embodiment, the first lens group includes a 1-1 lens, a 1-2 lens, a 1-3 lens, a 1-4 lens, and a 1-5 lens, wherein the 1-1 lens, the 1-2 lens, the 1-3 lens, the 1-4 lens, and the 1-5 lens are arranged in order from the object side to the image side along the optical axis and the 1-4 lens is with negative refractive power; and the surface shape of the object side surface of the 2-1 lens is different from that of the image side surface of the 1-3 lens, the surface shape of the image side surface of the 1-3 lens is concave when the surface shape of the object side surface of the 2-1 lens is convex, and the surface shape of the image side surface of the 1-3 lens is convex when the surface shape of the object side surface of the 2-1 lens is concave.

In yet another exemplary embodiment, the first lens group includes a 1-1 lens, a 1-2 lens, a 1-3 lens, a 1-4 lens, and a 1-5 lens; the 3-1 lens includes a convex surface facing the object side and a concave surface facing the image side; and the 1-1 lens, the 1-2 lens, the 1-3 lens, the 1-4 lens, and the 1-5 lens are arranged in order from the object side to the image side along the optical axis.

In another exemplary embodiment, the 1-3 lens is with positive refractive power; the 2-1 lens is with negative refractive power; the 2-1 lens is a biconcave lens and includes a concave surface facing the object side and another concave surface facing the image side when the 1-3 lens is a biconvex lens and includes a convex surface facing the object side and a convex surface facing the image side; and the 2-1 lens is also a meniscus lens when the 1-3 lens is a meniscus lens.

In yet another exemplary embodiment, the 1-3 lens includes a convex surface facing the object side and a concave surface facing the image side when the 1-3 lens is a meniscus lens; and the 2-1 lens includes a convex surface facing the object side and a concave surface facing the image side when the 2-1 lens is a meniscus lens.

In another exemplary embodiment, the 1-1 lens is a biconvex lens with positive refractive power and includes a convex surface facing the object side and another convex surface facing the image side; the 1-2 lens is a biconcave lens with negative refractive power and includes a concave surface facing the object side and another concave surface facing the image side; the 1-4 lens is a meniscus lens with negative refractive power and includes a convex surface facing the object side and a concave surface facing the image side; the 1-5 lens is a biconvex lens with positive refractive power and includes a convex surface facing the object side and another convex surface facing the image side; and the 2-2 lens is a biconvex lens with positive refractive power and further includes another convex surface facing the object side.

In yet another exemplary embodiment, the lens assembly further includes a stop disposed between the first lens group and the second lens group.

In another exemplary embodiment, the lens assembly satisfies at least one of following conditions: $0.35 \leq fG1/f \leq 0.45$; $-1.2 \leq fG2/f \leq -0.85$; $-0.5 \leq fG3/f \leq -0.4$; $Vd4 > Vd5$; $-0.92 \leq (1-\beta) \times \beta r \leq -0.7$; $2 \leq f/BFL \leq 4$; $2.8 \leq TTL/LG1L \leq 3.9$; wherein fG1 is an effective focal length of the first lens group, fG2 is an effective focal length of the second lens group, fG3 is an effective focal length of the third lens group, f is an effective focal length of the lens assembly, Vd4 is an Abbe number of the 1-4 lens, Vd5 is an Abbe number of the 1-5 lens, $\beta$ is a magnification of the second lens group, $\beta r$ is a magnification of the third lens group, BFL is an interval from an image side surface of a lens closest to the image side of the third lens group to an image plane along the optical axis, TTL is an interval from an object side surface of a lens closest to the object side of the first lens group to the image plane along the optical axis, and LG1L is an interval from the object side surface of the lens closest to the object side of the first lens group to an image side surface of a lens closest to the image side of the first lens group along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 depicts a longitudinal aberration diagram of the lens assembly in accordance with the first preferred embodiment of the invention;

FIG. 9 is a field curvature diagram of the lens assembly in accordance with the second preferred embodiment of the invention;

FIG. 10 is a distortion diagram of the lens assembly in accordance with the second preferred embodiment of the invention;

FIG. 15 is a field curvature diagram of the lens assembly in accordance with the third preferred embodiment of the invention;

FIG. 16 is a distortion diagram of the lens assembly in accordance with the third preferred embodiment of the invention;

DETAILED DESCRIPTION OF THE INVENTION

Figure 1:
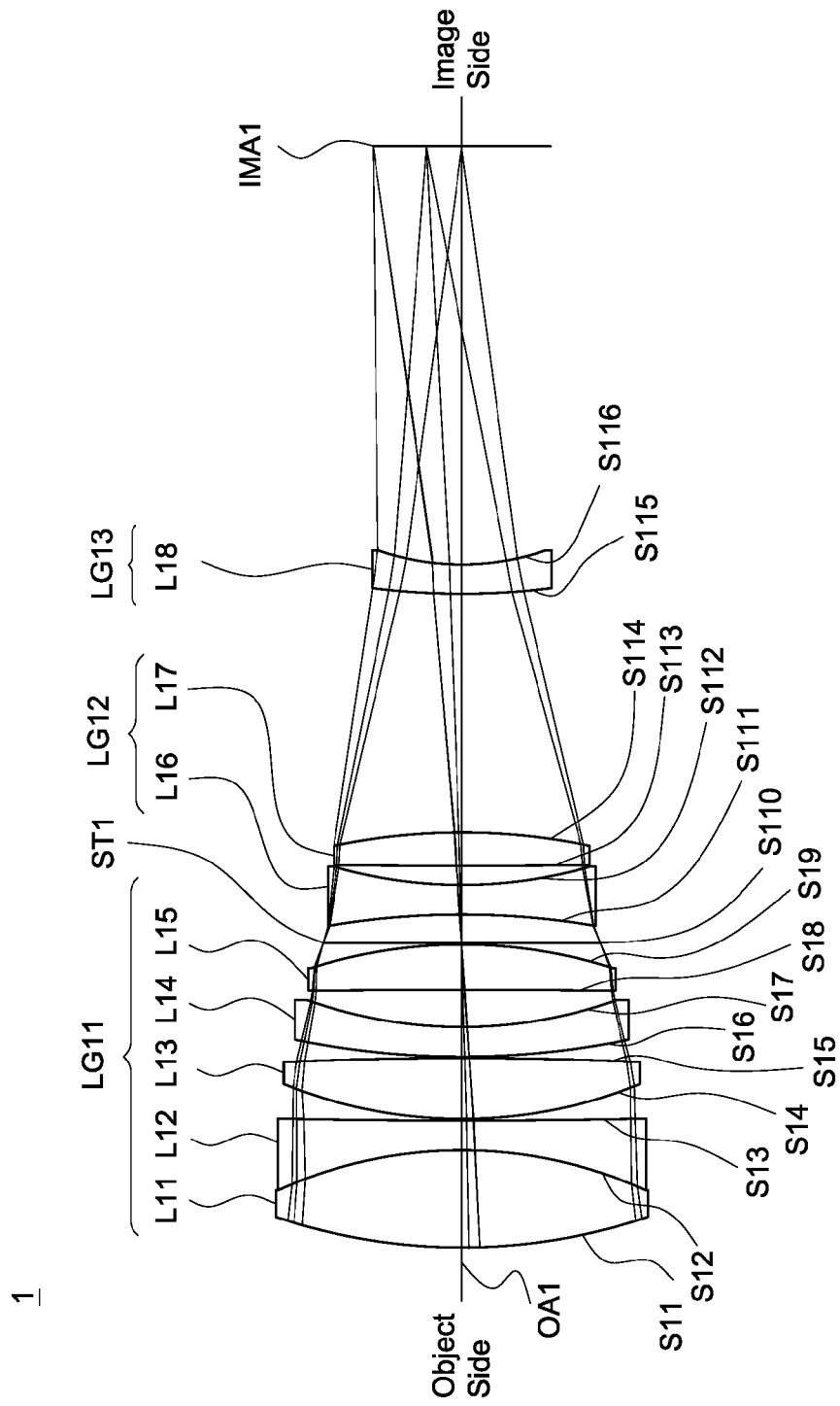
FIG. 1 is a lens layout and optical path diagram of a lens assembly in accordance with a first preferred embodiment of the invention.
Figure 4:
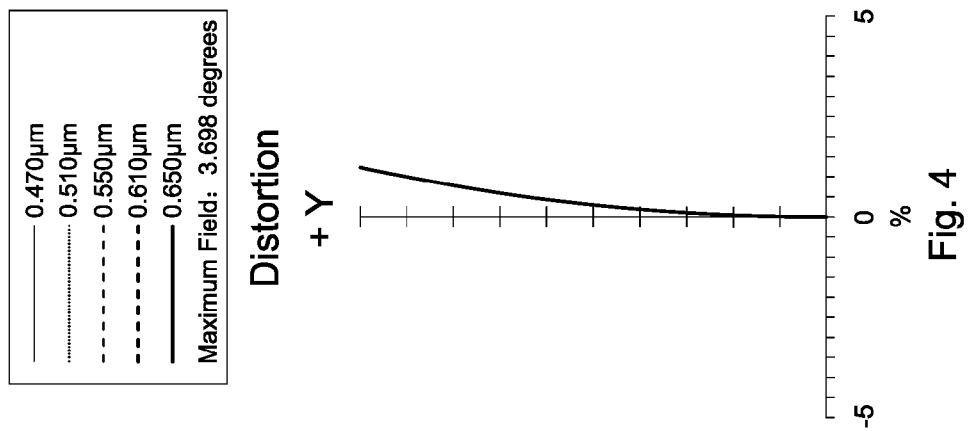
FIG. 4 is a distortion diagram of the lens assembly in accordance with the first preferred embodiment of the invention.
Figure 3:
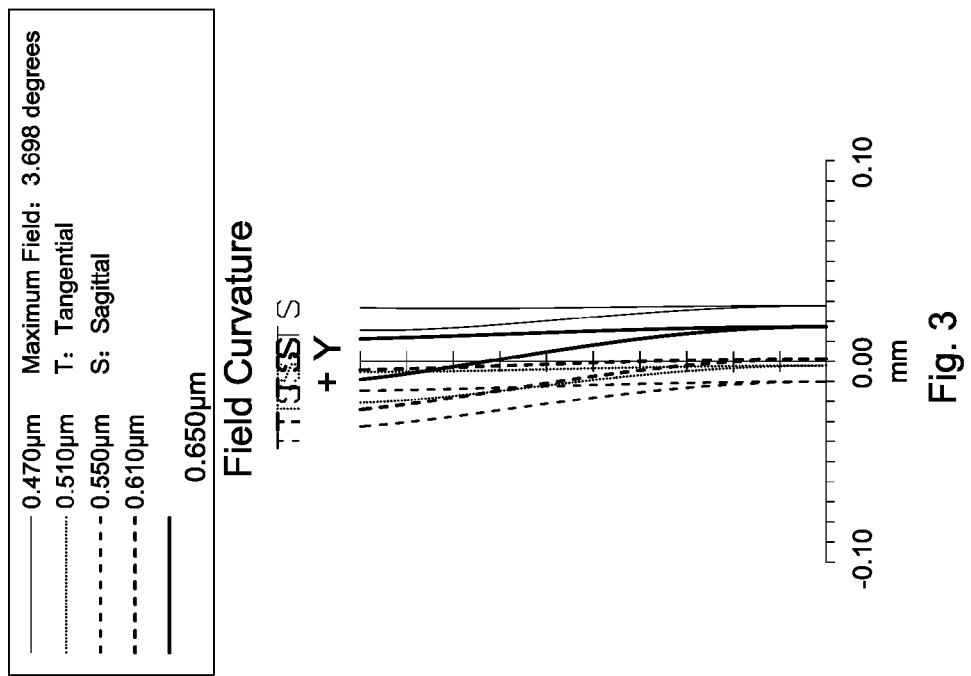
FIG. 3 is a field curvature diagram of the lens assembly in accordance with the first preferred embodiment of the invention.
Figure 5:
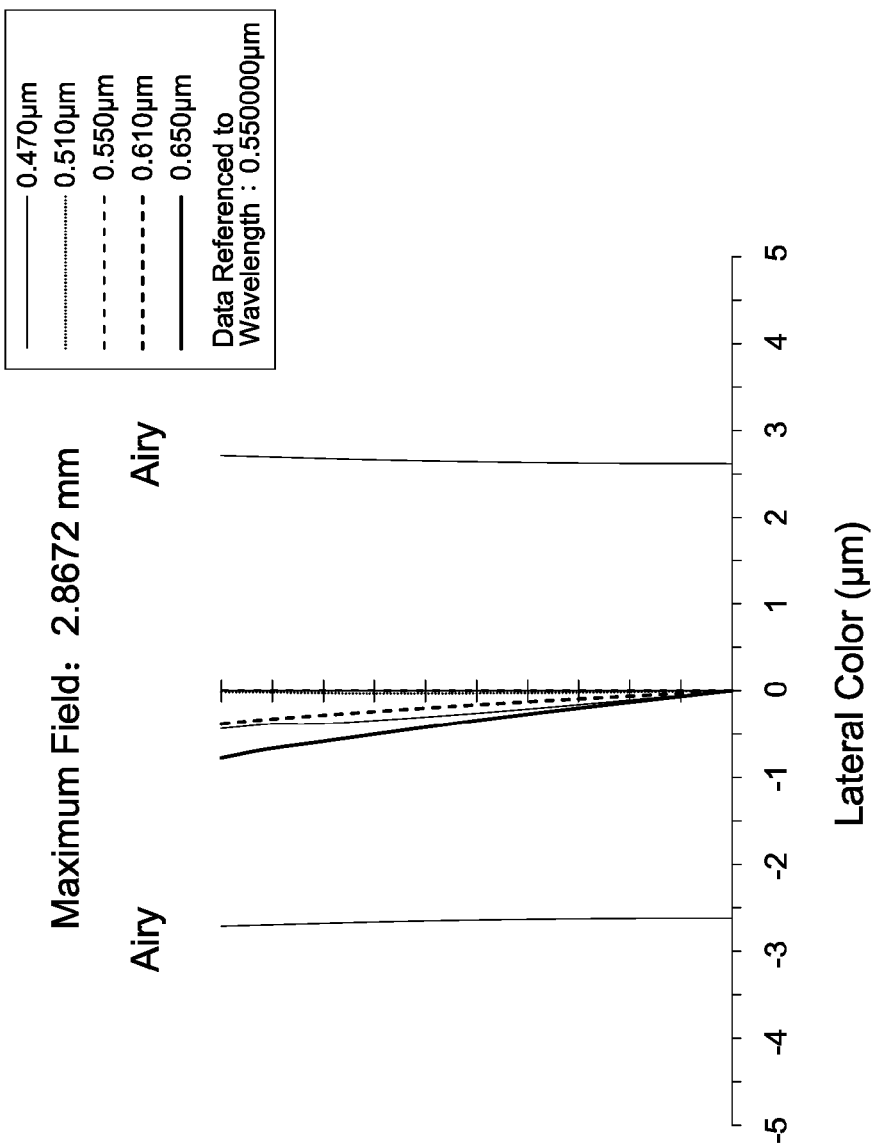
FIG. 5 is a lateral color diagram of the lens assembly in accordance with the first preferred embodiment of the invention.
Figure 6:
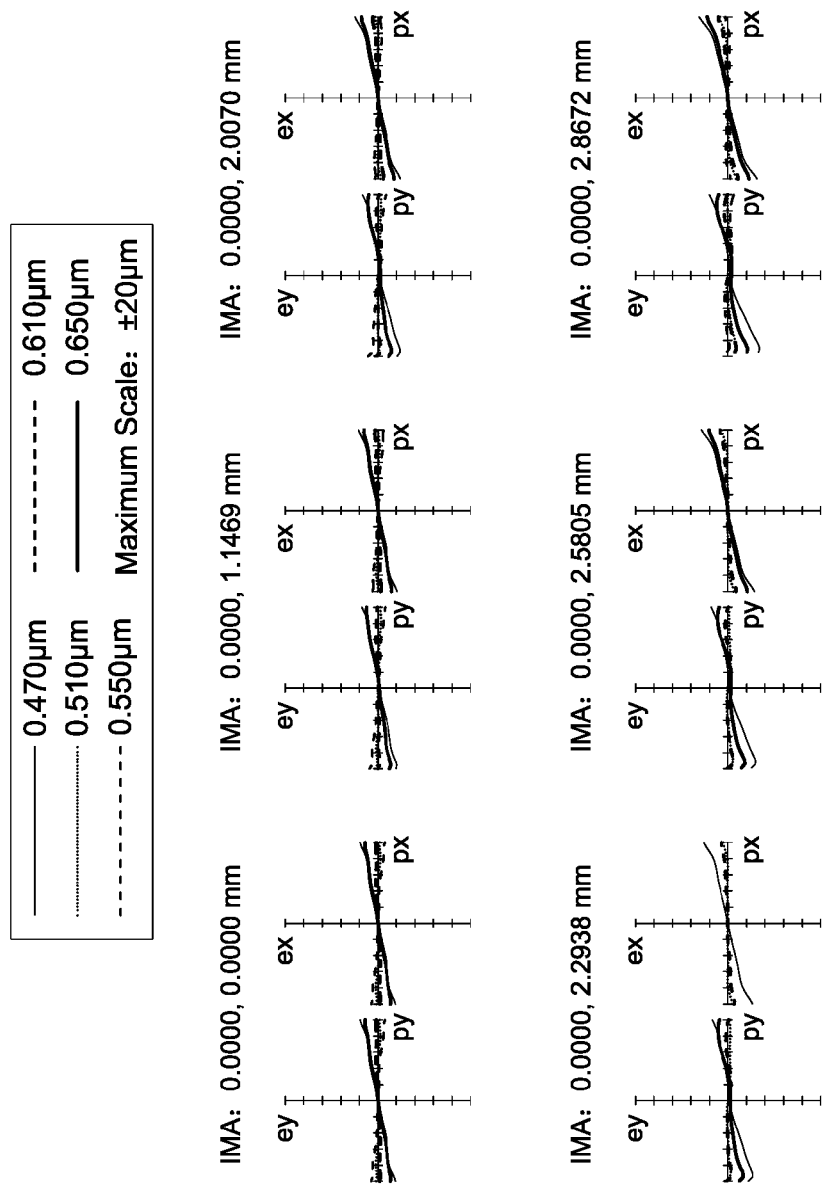
FIG. 6 is a transverse ray fan plot of the lens assembly in accordance with the first preferred embodiment of the invention.

The following description is made for the purpose of illustrating the general principles of the invention and should not be taken in a limiting sense. The scope of the invention is best determined by reference to the appended claims.

The present invention provides a lens assembly. The lens assembly of the first embodiment includes a first lens group, a second lens group, and a third lens group, which are arranged in order from an object side to an image side along an optical axis. The first lens group is with positive refractive power and includes at least four lenses arranged in order from the object side to the image side along the optical axis, wherein the refractive power of the lenses can be positive or negative but not all negative, the lens of the lenses closest to the object side includes a convex surface facing the object side to ensure image quality and includes a concave surface, a convex surface, or a plane surface facing the image side, the lens of the lenses closest to the image side includes a convex surface facing the image side to ensure image quality and includes a concave surface, a convex surface, or a plane surface facing the object side, and the remaining two of the four lenses can be a biconvex lens, a biconcave lens, a meniscus lens, a plano-convex lens, or a plano-concave lens. The second lens group is with negative refractive power and includes a 2-1 lens and a 2-2 lens, wherein the refractive power of the 2-1 lens and 2-2 lens can be positive or negative but not all positive, the 2-2 lens includes a convex surface facing the image side to ensure image quality and includes a concave surface, a convex surface, or a plane surface facing the object side, the 2-1 lens can be a biconvex lens, a biconcave lens, a meniscus lens, a plano-convex lens, or a plano-concave lens. The third lens group is with negative refractive power and includes a 3-1 lens, wherein the 3-1 lens is a meniscus lens with negative refractive power. The above-described embodiment can achieve the basic function.

The present invention provides a lens assembly of the second embodiment which is different from the first embodiment in that the second lens group can move along the direction perpendicular to the optical axis to perform optical image stabilization and the second lens group includes two lenses so as to maintain better image quality during anti-shake. The third lens group can move along the optical axis for focusing and the third lens group has negative refractive power so as to reduce total lens length during focusing.

The present invention provides a lens assembly of the third embodiment which is different from the second embodiment in that the first lens group includes at least three lenses with positive refractive power and one lens with negative refractive power, the refractive power of the 2-1 lens is opposite to the refractive power of the 2-2 lens, and the second lens group includes a meniscus lens when the first lens group includes two meniscus lenses.

The present invention provides a lens assembly of the fourth embodiment which is different from the first embodiment in that the first lens group includes a 1-1 lens, a 1-2 lens, a 1-3 lens, a 1-4 lens, and a 1-5 lens, the surface shape of the image side surface of the 1-3 lens is different to the surface shape of the object side surface of the 2-1 lens, the image side surface of the 1-3 lens is concave when the object side surface of the 2-1 lens is convex, and the image side surface of the 1-3 lens is convex when the object side surface of the 2-1 lens is concave.

The present invention provides a lens assembly of the fifth embodiment. Referring to Table 1, Table 2, Table 4, Table 5, Table 7, and Table 8, wherein Table 1, Table 4, and Table 7 show optical specification in accordance with a first, second, and third preferred embodiments of the invention, respectively and Table 2, Table 5, and Table 8 show aspheric coefficients of each aspheric lens in Table 1, Table 4, and Table 7, respectively.

Figure 7:
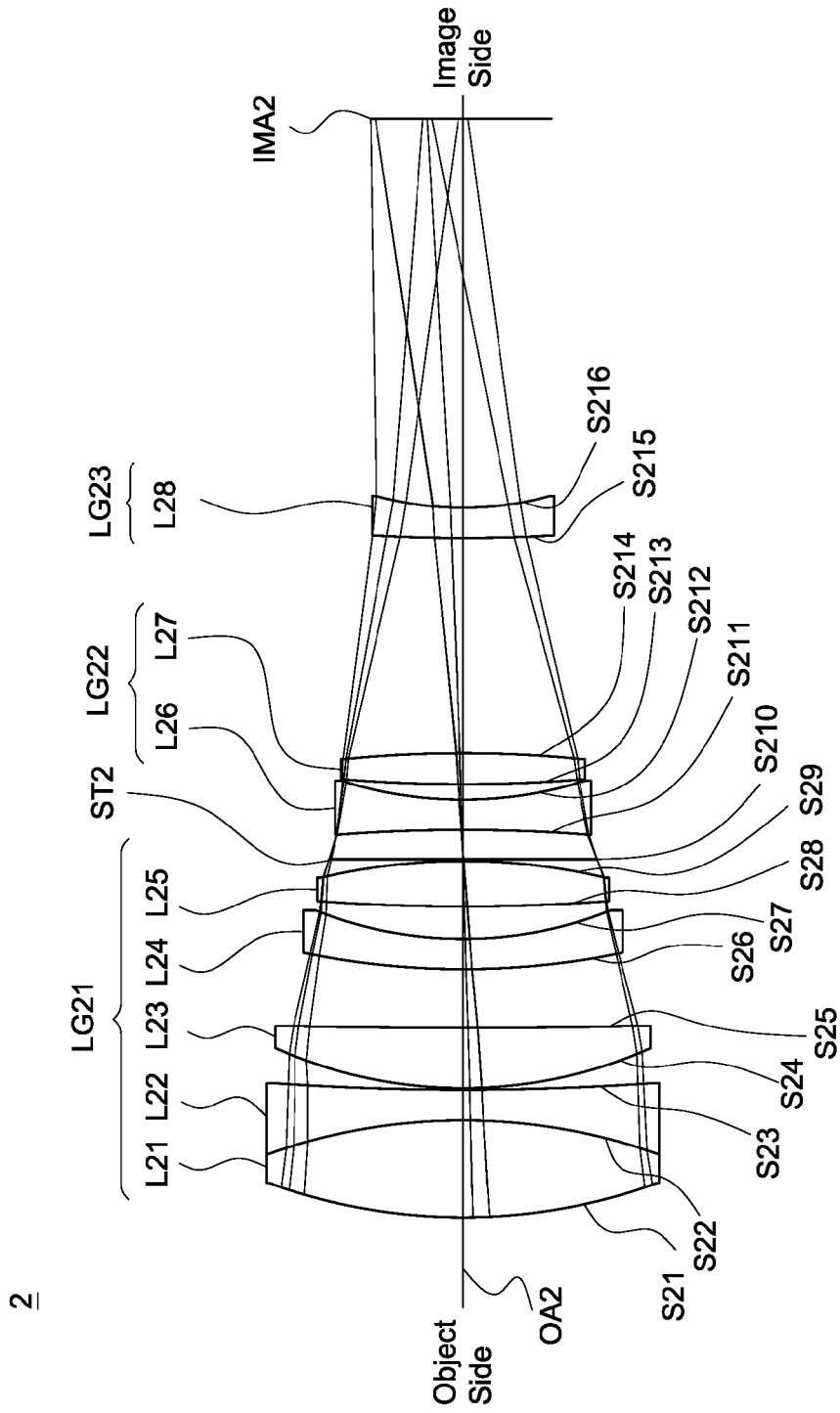
FIG. 7 is a lens layout and optical path diagram of a lens assembly in accordance with a second preferred embodiment of the invention.
Figure 8:
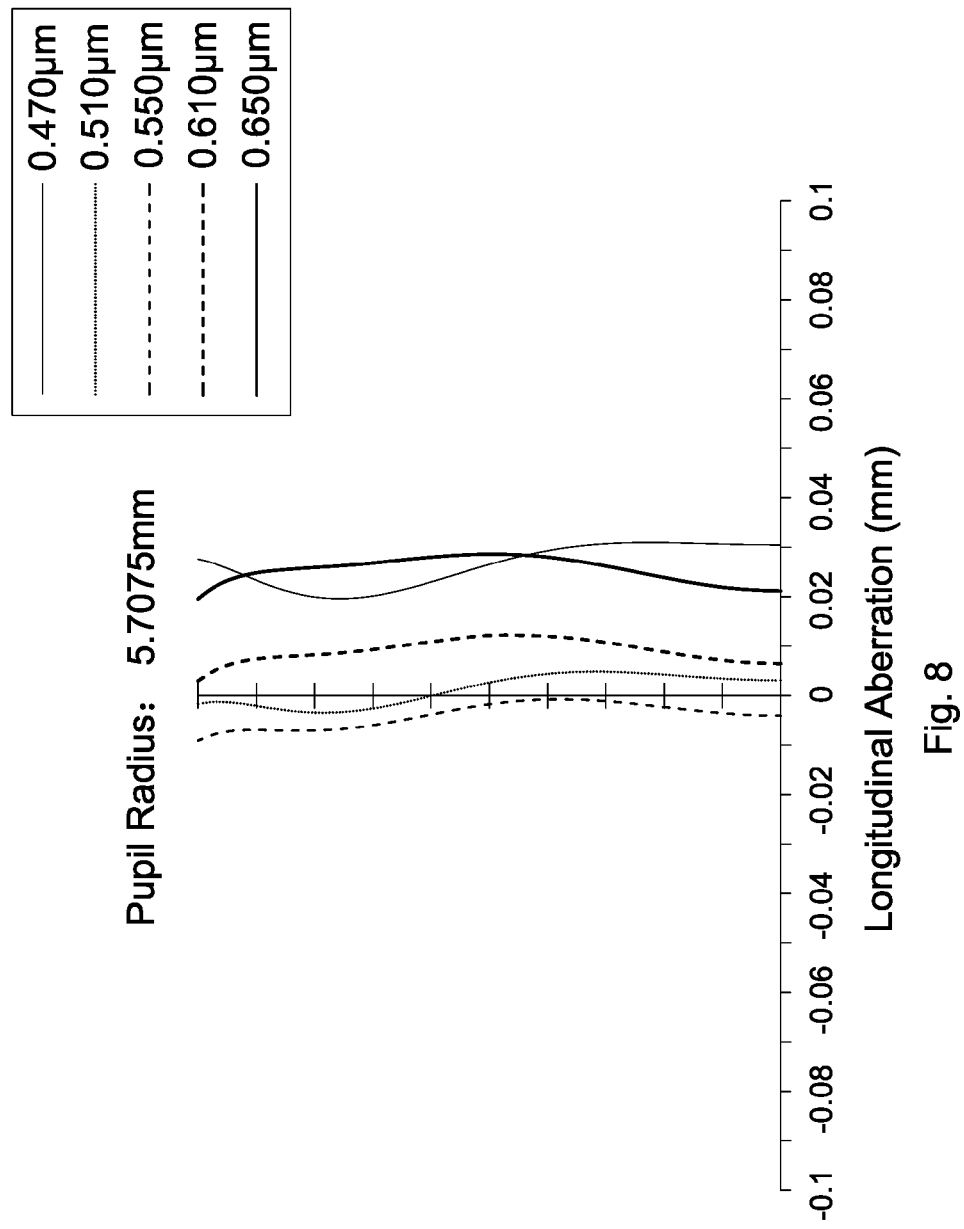
FIG. 8 depicts a longitudinal aberration diagram of the lens assembly in accordance with the second preferred embodiment of the invention.
Figure 11:
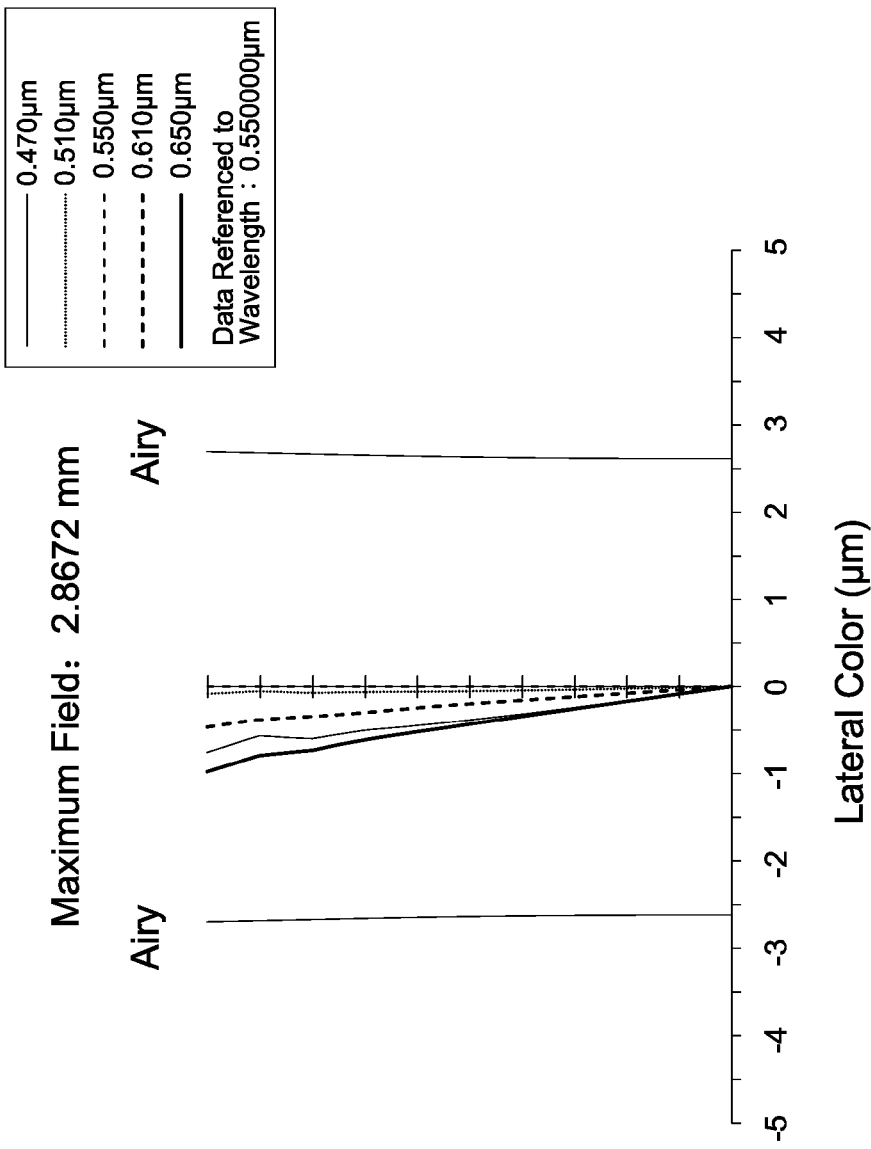
FIG. 11 is a lateral color diagram of the lens assembly in accordance with the second preferred embodiment of the invention.
Figure 12:
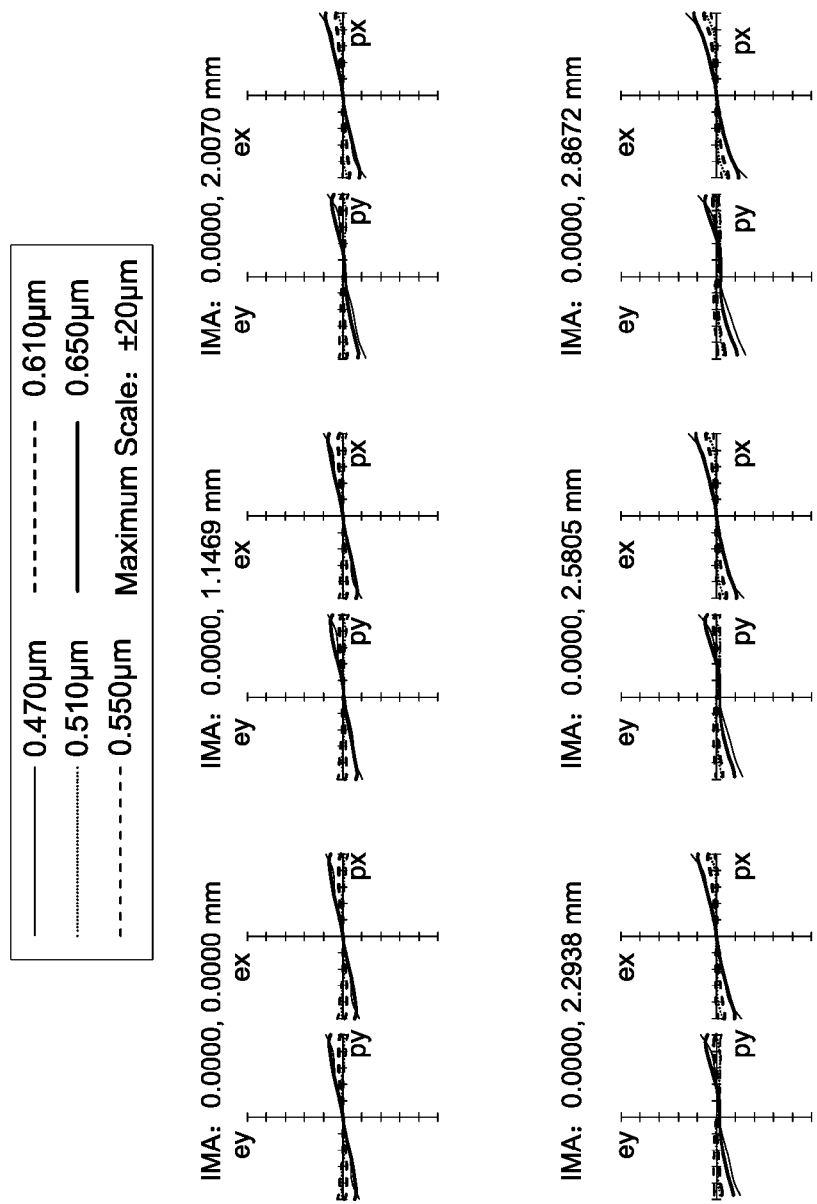
FIG. 12 is a transverse ray fan plot of the lens assembly in accordance with the second preferred embodiment of the invention.
Figure 13:
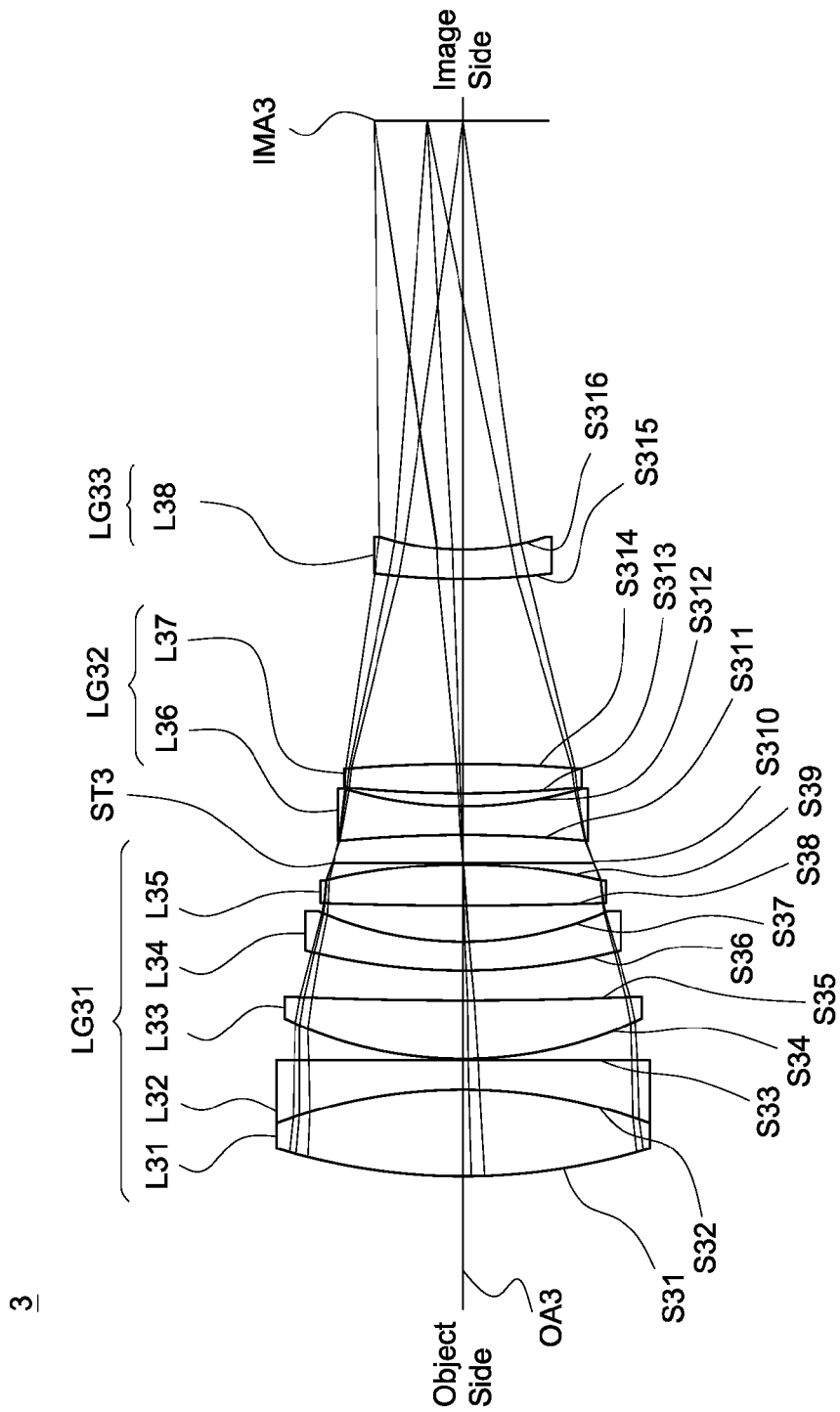
FIG. 13 is a lens layout and optical path diagram of a lens assembly in accordance with a third preferred embodiment of the invention.
Figure 14:
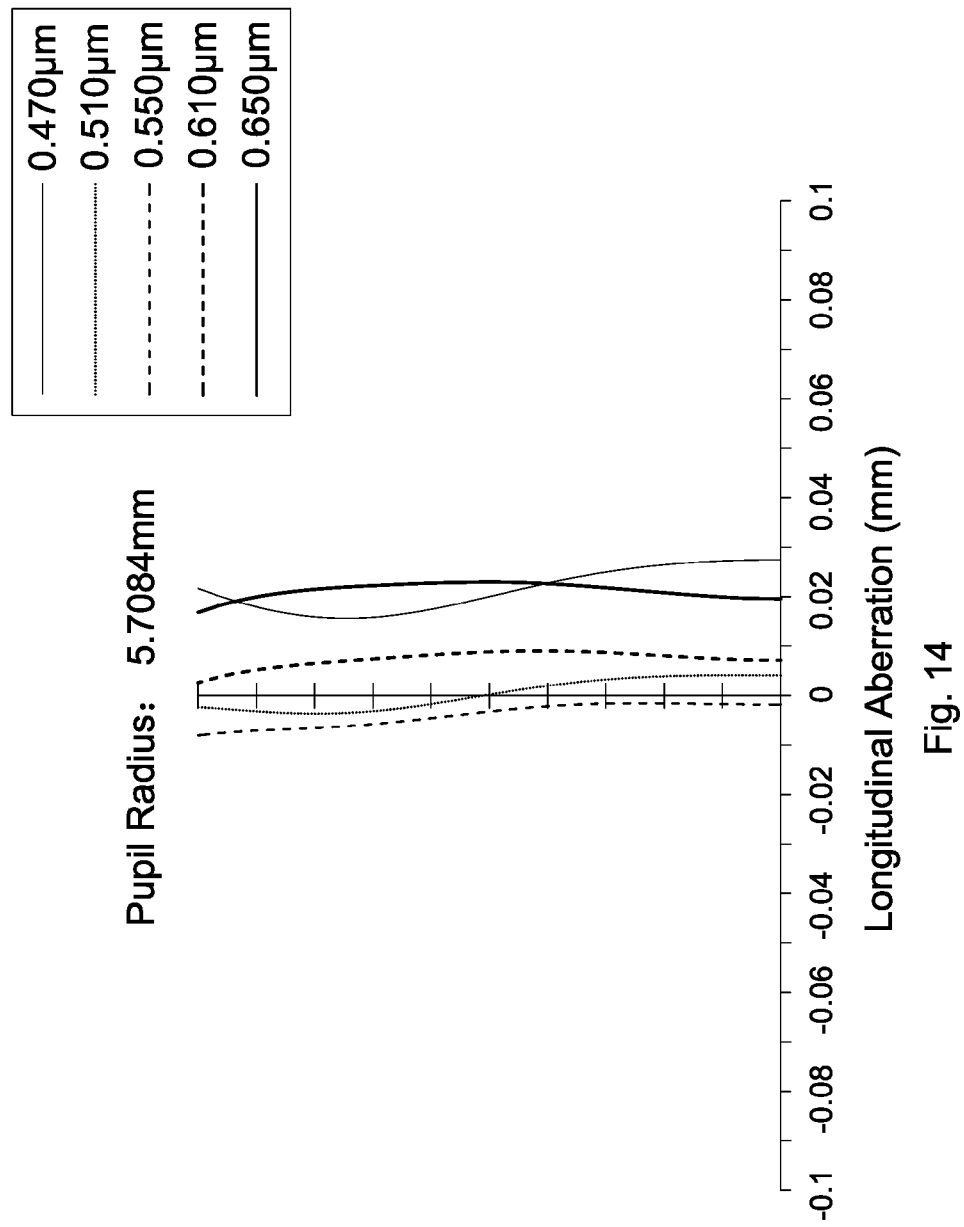
FIG. 14 depicts a longitudinal aberration diagram of the lens assembly in accordance with the third preferred embodiment of the invention.
Figure 17:
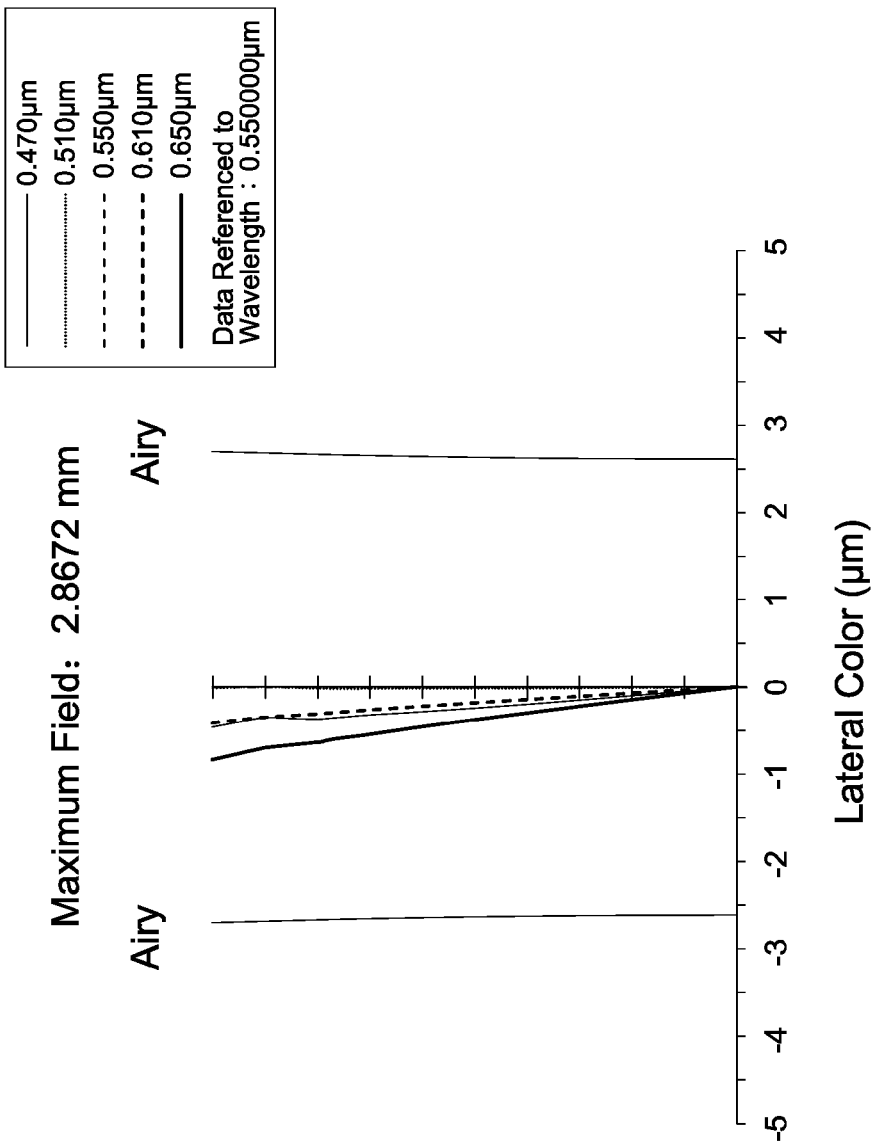
FIG. 17 is a lateral color diagram of the lens assembly in accordance with the third preferred embodiment of the invention.
Figure 18:
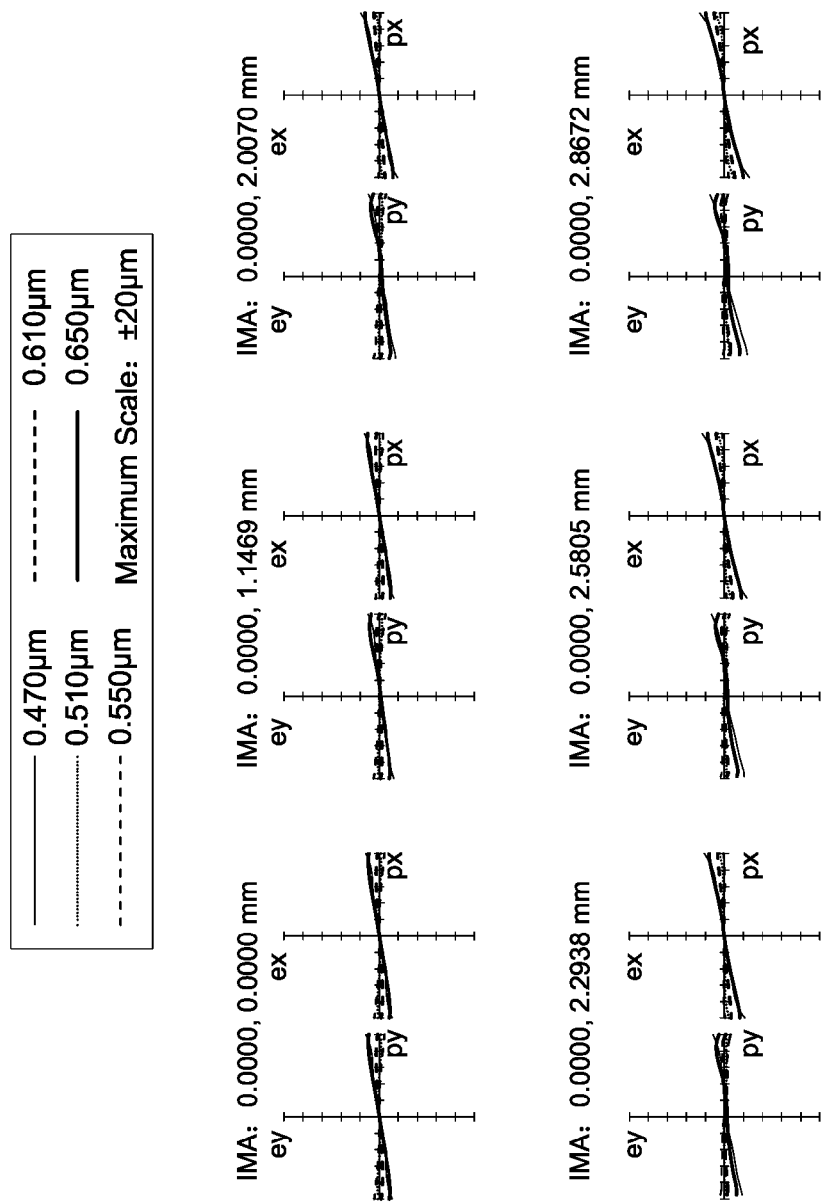
FIG. 18 is a transverse ray fan plot of the lens assembly in accordance with the third preferred embodiment of the invention.

FIG. 1, FIG. 7, and FIG. 13 are lens layout and optical path diagrams of the lens assembly in accordance with the first, second, and third preferred embodiments of the invention, respectively. The lens assembly 1 includes a first lens group LG11, a stop ST1, a second lens group LG12, and a third lens group LG13, all of which are arranged in order from an object side to an image side along an optical axis OA1. The first lens groups LG11 is with positive refractive power and includes a 1-1 lens L11, a 1-2 lens L12, a 1-3 lens L13, a 1-4 lens L14, and a 1-5 lens L15. The second lens group LG12 is with negative refractive power and includes a 2-1 lens L16 and a 2-2 lens L17. The third lens group LG13 is with negative refractive power and includes a 3-1 lens L18. The lens assembly 2 includes a first lens group LG21, a stop ST2, a second lens group LG22, and a third lens group LG23, all of which are arranged in order from an object side to an image side along an optical axis OA2. The first lens groups LG21 is with positive refractive power and include a 1-1 lens L21, a 1-2 lens L22, a 1-3 lens L23, a 1-4 lens L24, and a 1-5 lens L25. The second lens group LG22 is with negative refractive power and includes a 2-1 lens L26 and a 2-2 lens L27. The third lens group LG23 is with negative refractive power and includes a 3-1 lens L28. The lens assembly 3 includes a first lens group LG31, a stop ST3, a second lens group LG32, and a third lens group LG33, all of which are arranged in order from an object side to an image side along an optical axis OA3. The first lens groups LG31 is with positive refractive power and include a 1-1 lens L31, a 1-2 lens L32, a 1-3 lens L33, a 1-4 lens L34, and a 1-5 lens L35. The second lens group LG32 is with negative refractive power and includes a 2-1 lens L36 and a 2-2 lens L37. The third lens group LG33 is with negative refractive power and includes a 3-1 lens L38.

The 1-1 lenses L11, L21, L31 are biconvex lenses with positive refractive power and made of glass material. Both of the object side surfaces S11, S21, S31, and the image side surfaces S12, S22, S32 are convex surfaces, and spherical surfaces. The 1-2 lenses L12, L22, L32 are biconcave lenses with negative refractive power and made of glass material. Both of the object side surfaces S12, S22, S32 and the image side surfaces S13, S23, S33 are concave surfaces and spherical surfaces. The 1-3 lenses L13, L23, L33 are with positive refractive power and made of glass material, wherein the object side surfaces S14, S24, S34 are convex surfaces and both of the object side surfaces S14, S24, S34 and image side surfaces S15, S25, S35 are spherical surfaces. The 1-4 lenses L14, L24, L34 are meniscus lenses with negative refractive power, wherein the object side surfaces S16, S26, S36 are convex surfaces and aspheric surfaces, the image side surfaces S17, S27, S37 are concave surfaces and spherical surfaces. The 1-5 lenses L15, L25, L35 are biconvex lenses with positive refractive power and made of plastic material, wherein the object side surfaces S18, S28, S38 are convex surfaces and aspheric surfaces, the image side surfaces S19, S29, S39 are convex surfaces and spherical surfaces. The 2-1 lenses L16, L26, L36 are with negative refractive power and made of plastic material, wherein the image side surfaces S112, 5212, S312 are concave surfaces and spherical surfaces, the object side surfaces S111, S211, S311 are aspheric surfaces. The 2-2 lenses L17, L27, L37 are biconvex lenses with positive refractive power and made of plastic material, wherein the object side surfaces S113, 5213, S313 are convex surfaces and aspheric surfaces, the image side surfaces S114, S214, S314 are convex surfaces and spherical surfaces. The 3-1 lenses L18, L28, L38 are meniscus lenses with negative refractive power, wherein the object side surfaces S115, S215, S315 are convex surfaces, the image side surfaces S116, S216, S316 are concave surfaces, and both of the object side surfaces S115, S215, S315 and image side surfaces S116, S216, S316 are spherical surfaces. The 1-1 lenses L11, L21, L31 and the 1-2 lenses L12, L22, L32 are cemented or there is no air gap therebetween, and in other embodiments, the cemented lens can also be a single lens with positive refractive power. The second lens group LG12 can move along the direction perpendicular to the optical axis OA1 to perform optical image stabilization, and the lenses of the second lens group LG12 are made of plastic material, so as to reduce weight and increase response speed. The third lens group LG13 can move along the optical axis OA1 for focusing. The surface shape of the object side surface of the 1-1 lens and the surface shape of the image side surface of the 1-5 lens can effectively ensure the image quality. The surface shape of the image side surface of the 1-1 lens can effectively improve the chromatic aberration. The surface shape of the object side surface of the 2-1 lens and the surface shape of the image side surface of the 2-2 lens can effectively ensure the anti-shake function. The surface shape of the image side surface of the 1-3 lens is different from the surface shape of the object side surface of the 2-1 lens can effectively ensure the image quality.

The above design can effectively shorten the total lens length, effectively increase the resolution, effectively correct the chromatic aberration and aberration, and anti-shake function. In addition, the lens assemblies of the invention can satisfy at least one of the following conditions to optimize the above functions:

$$0.35 \le fG1/f \le 0.45; \tag{1}$$

$$-1.2 \le fG2/f \le -0.85; \tag{2}$$

$$-0.5 \le fG3/f \le -0.4; \tag{3}$$

$$Vd4 > Vd5; \tag{4}$$

$$-0.92 \le (1-\beta) \times \beta r \le -0.7; \tag{5}$$

$$2 \le f/BFL \le 4; \tag{6}$$

$$2.8 \le TTL/LG1L \le 3.9; \tag{7}$$

wherein fG1 is an effective focal length of the first lens group, such as the first lens groups LG11, LG21, LG31 for the first to third preferred embodiments, fG2 is an effective focal length of the second lens group, such as the second lens groups LG12, LG22, LG32 for the first to third preferred embodiments, fG3 is an effective focal length of the third lens group, such as the third lens groups LG13, LG23, LG33 for the first to third preferred embodiments, f is an effective focal length of the lens assembly, such as the lens assemblies 1, 2, 3 for the first to third preferred embodiments, Vd4 is an Abbe number of the 1-4 lens, such as the 1-4 lenses L14, L24, L34 for the first to third preferred embodiments, Vd5 is an Abbe number of the 1-5 lens, such as the 1-5 lenses L15, L25, L35 for the first to third preferred embodiments, β is a magnification of the second lens group, such as the second lens groups LG12, LG22, LG32 for the first to third preferred embodiments, βr is a magnification of the third lens group, such as the third lens groups LG13, LG23, LG33 for the first to third preferred embodiments, BFL is an interval from the image side surface of the 3-1 lens to the image plane along the optical axis, such as the image side surfaces S116, S216, S316 of the 3-1 lenses L18, L28, L38 closest to the image side of the third lens groups LG13, LG23, LG33 to the image planes IMA1, IMA2, IMA3 along the optical axes OA1, OA2, OA3 for the first to third preferred embodiments, TTL is an interval from the object side surface of the 1-1 lens to the image plane along the optical axis, such as the object side surfaces S11, S21, S31 of the 1-1 lenses L11, L21, L31 closest to the object side of the first lens groups LG11, LG21, LG31 to the image planes IMA1, IMA2, IMA3 along the optical axes OA1, OA2, OA3 for the first to third preferred embodiments, LG1L is an interval from the object side surface of the 1-1 lens to the image side surface of the 1-5 lens along the optical axis, such as the object side surfaces S11, S21, S31 of the 1-1 lenses L11, L21, L31 closest to the object side of the first lens groups LG11, LG21, LG31 to the image side surfaces S19, S29, S39 of the 1-5 lenses L15, L25, L35 closest to the image side of the first lens groups LG11, LG21, LG31 along the optical axes OA1, OA2, OA3 for the first to third preferred embodiments. The above magnification equals to Tan($\theta$1) divided by Tan($\theta$2), wherein $\theta$1 is the incident beam angle and $\theta$2 is the output beam angle. Taking the magnification of the second lens group as an example, the measurement method for Tan($\theta$1) is to pass the collimated light through a lens group which is before the second lens group. The other side of the lens group relative to the collimated light is provided with a shading plate (or stop) which has a predetermined radius, and then measure the distance from the focal point of the light passing through the shading plate to the shading plate. Then Tan($\theta$1) is equal to the radius of the shading plate divided by the distance from the focal point to the shading plate. The measurement method for Tan($\theta$2) is the same as above, except that the shading plate is set on the other side of the second lens group relative to the collimated light, that is, the collimated light will first pass through the lens group which is before the second lens group, then pass through the second lens group and shading plate, then measure the distance from the focal point to the shading plate. Then Tan($\theta$2) is equal to the radius of the shading plate divided by the distance from the focal point to the shading plate.

When the condition (1): $0.35 \leq fG1/f \leq 0.45$ is satisfied, the lens assembly can effectively achieve the purpose of miniaturization. When the condition (2): $-1.2 \leq fG2/f \leq -0.85$ is satisfied, the movement of the anti-shake lens group can be effectively and accurately controlled. When the condition (3): $-0.5 \leq fG3/f \leq -0.4$ is satisfied, the movement of the focusing lens group can be effectively and accurately controlled. When the condition (4): Vd4>Vd5 is satisfied, the chromatic aberration can be effectively decreased. When the condition (5): $-0.92 \leq (1-\beta) \times \beta r \leq -0.7$ is satisfied, the optical image stabilization can be effectively improved. When the condition (6): $2 \leq f/BFL \leq 4$ is satisfied, the ghost image can be effectively reduced. When the condition (7): $2.8 \leq TTL/LG1L \leq 3.9$ is satisfied, the total lens length can be effectively shortened.

A detailed description of a lens assembly in accordance with a first preferred embodiment of the invention is as follows. Referring to FIG. 1, the lens assembly 1 includes a first lens group LG11, a stop ST1, a second lens group LG12, and a third lens group LG13, all of which are arranged in order from an object side to an image side along an optical axis OA1. The first lens group LG11 includes a 1-1 lens L11, a 1-2 lens L12, a 1-3 lens L13, a 1-4 lens L14, and a 1-5 lens L15, all of which are arranged in order from the object side to the image side along the optical axis OA1. The second lens group LG12 includes a 2-1 lens L16 and a 2-2 lens L17, which are arranged in order from the object side to the image side along the optical axis OA1. The third lens group LG13 includes a 3-1 lens L18. In operation, a light from the object side is imaged on an image plane IMA1.

According to the foregoing, wherein: the 1-3 lens L13 is a biconvex lens, wherein the image side surface S15 is a convex surface; the 1-4 lens L14 is made of plastic material; the 2-1 lens L16 is a biconcave lens, wherein the object side surface S111 is a concave surface; and the 3-1 lens L18 is made of glass material. With the above design of the lenses, the lens assembly 1 can have an effective shortened total lens length, an effective increased resolution, an effective corrected aberration, and an effective corrected chromatic aberration.

Table 1 shows the optical specification of the lens assembly 1 in FIG. 1.

TABLE 1

| Effective Focal Length = 43.79 mm F-number = 3.9 | | | | | |
|---|---|---|---|---|---|
| Total Lens Length = 37.15 mm Field of View = 7.396 degrees | | | | | |
| Surface Number | Radius of Curvature (mm) | Thickness (mm) | Nd | Vd | Effective Focal Length (mm) | Remark |
| S11 | 17.89 | 3.29 | 1.5 | 81.6 | 35.9 | L11 |
| S12 | −13.62 | 1.00 | 1.8 | 29.8 | −44.3 | L12 |
| S13 | 294.31 | 0.05 | | | | |
| S14 | 14.52 | 2.06 | 1.49 | 70.2 | 26.6 | L13 |
| S15 | −120.65 | 0.05 | | | | |
| S16 | 40.61 | 1.00 | 1.54 | 56.1 | −59.5 | L14 |
| S17 | 14.14 | 1.25 | | | | |
| S18 | 49.41 | 1.54 | 1.62 | 25.9 | 22.5 | L15 |
| S19 | −15.14 | 0.05 | | | | |
| S110 | ∞ | 0.95 | | | | ST1 |
| S111 | −196.47 | 1.00 | 1.54 | 56.1 | −17.6 | L16 |
| S112 | 14.04 | 0.68 | | | | |
| S113 | 33.04 | 1.11 | 1.62 | 25.9 | 35.1 | L17 |
| S114 | −18.62 | 8.03 | | | | |
| S115 | 21.87 | 1.00 | 1.69 | 31.1 | −18.6 | L18 |
| S116 | 7.96 | 14.10 | | | | |

The aspheric surface sag z of each aspheric lens in table 1 can be calculated by the following formula:

$$z = ch^2/\{1+[1-(k+1)c^2h^2]^{1/2}\} \pm Ah^2 + Bh^4 + Ch^6 + Dh^8$$

where c is curvature, h is the vertical distance from the lens surface to the axis, k is conic constant and A, B, C and D are aspheric coefficients.

In the first preferred embodiment, the conic constant k and the aspheric coefficients A, B, C, D of each aspheric lens are shown in Table 2.

TABLE 2

| Surface Number | k | A | B | C | D |
|---|---|---|---|---|---|
| S16 | 0 | 0.00694719 | 2.0744E−05 | −1.0852E−07 | −4.52156E−09 |
| S18 | 0 | −0.007208136 | −0.0001699 | −4.55915E−08 | 7.08252E−09 |
| S111 | 0 | −0.014293995 | −0.0002425 | 3.41758E−06 | −2.22771E−08 |
| S113 | 0 | −0.019096796 | 0.0002371 | −2.12645E−06 | 1.55563E−08 |

Table 3 shows the parameters and condition values for conditions (1)-(7) in accordance with the lens assembly 1 of the first preferred embodiment. It can be seen from Table 3 that the lens assembly 1 of the first preferred embodiment satisfies the conditions (1)-(7).

TABLE 3

| fG1 | 16.52 mm | fG2 | −39.09 mm | fG3 | −18.59 mm |
|---|---|---|---|---|---|
| β | 1.5247 | βr | 1.7388 | BFL | 14.10 mm |
| LG1L | 10.24 mm | | | | |
| fG1/f | 0.38 | fG2/f | −0.89 | fG3/f | −0.42 |
| (1 − β) × βr | −0.91 | f/BFL | 3.11 | TTL/LG1L | 3.63 |

In addition, the lens assembly 1 of the first preferred embodiment can meet the requirements of optical performance as seen in FIGS. 2-6. It can be seen from FIG. 2 that the longitudinal aberration in the lens assembly 1 of the first preferred embodiment ranges from −0.02 mm to 0.03 mm. It can be seen from FIG. 3 that the field curvature of tangential direction and sagittal direction in the lens assembly 1 of the first preferred embodiment ranges from −0.04 mm to 0.03 mm. It can be seen from FIG. 4 that the distortion in the lens assembly 1 of the first preferred embodiment ranges from 0% to 1.5%. It can be seen from FIG. 5 that the lateral color in the lens assembly 1 of the first preferred embodiment ranges from −1 μm to 0 μm. It can be seen from FIG. 6 that the transverse aberration in the lens assembly 1 of the first preferred embodiment ranges from −8 μm to 8 μm. It is obvious that the longitudinal aberration, the field curvature, the distortion, the lateral color, and the transverse aberration of the lens assembly 1 of the first preferred embodiment can be corrected effectively. Therefore, the lens assembly 1 of the first preferred embodiment is capable of good optical performance.

A detailed description of a lens assembly in accordance with a second preferred embodiment of the invention is as follows. Referring to FIG. 7, the lens assembly 2 includes a first lens group LG21, a stop ST2, a second lens group LG22, and a third lens group LG23, all of which are arranged in order from an object side to an image side along an optical axis OA2. The first lens group LG21 includes a 1-1 lens L21, a 1-2 lens L22, a 1-3 lens L23, a 1-4 lens L24, and a 1-5 lens L25, all of which are arranged in order from the object side to the image side along the optical axis OA2. The second lens group LG22 includes a 2-1 lens L26 and a 2-2 lens L27, both of which are arranged in order from the object side to the image side along the optical axis OA2. The third lens group LG23 includes a 3-1 lens L28. In operation, a light from the object side is imaged on an image plane IMA2.

According to the foregoing, wherein: the 1-3 lens L23 is a meniscus lens, wherein the image side surface S25 is a concave surface; the 1-4 lens L24 is made of glass material; the 2-1 lens L26 is a meniscus lens, wherein the object side surface S211 is a convex surface; and the 3-1 lens L28 is made of plastic material. With the above design of the lenses, the lens assembly 2 can have an effective shortened total lens length, an effective increased resolution, an effective corrected aberration, and an effective corrected chromatic aberration.

Table 4 shows the optical specification of the lens assembly 2 in FIG. 7.

TABLE 4

Effective Focal Length = 43.79 mm F-number = 3.9
Total Lens Length = 37.15 mm Field of View = 7.416 degrees

| Surface Number | Radius of Curvature (mm) | Thickness (mm) | Nd | Vd | Effective Focal Length (mm) | Remark |
|---|---|---|---|---|---|---|
| S21 | 16.56 | 3.19 | 1.5 | 81.6 | 17.3 | L21 |
| S22 | −16.80 | 1.00 | 1.8 | 29.8 | −17.2 | L22 |
| S23 | 82.36 | 0.05 | | | | |
| S24 | 13.48 | 1.97 | 1.49 | 70.2 | 29.1 | L23 |
| S25 | 236.37 | 1.92 | | | | |
| S26 | 36.80 | 1.00 | 1.56 | 60.7 | −43.7 | L24 |
| S27 | 11.65 | 1.05 | | | | |
| S28 | 30.56 | 1.50 | 1.62 | 25.9 | 20.5 | L25 |
| S29 | −17.65 | 0.05 | | | | |
| S210 | ∞ | 0.95 | | | | ST2 |
| S211 | 93.21 | 1.00 | 1.54 | 56.1 | −19.2 | L26 |
| S212 | 11.74 | 0.51 | | | | |
| S213 | 25.31 | 1.02 | 1.62 | 25.9 | 36.7 | L27 |
| S214 | −33.41 | 7.05 | | | | |
| S215 | 44.30 | 1.00 | 1.62 | 25.9 | −20.4 | L28 |
| S216 | 9.74 | 13.88 | | | | |

The definition of aspheric surface sag z of each aspheric lens in Table 4 is the same as that of in Table 1, and is not described here again. In the second preferred embodiment, the conic constant k and the aspheric coefficients A, B, C, D of each aspheric lens are shown in Table 5.

TABLE 5

| Surface Number | k | A | B | C | D |
|---|---|---|---|---|---|
| S26 | 0 | 0.008403 | 7.39E−06 | −1.36359E−07 | 1.96576E−10 |
| S28 | 0 | −0.00489 | −0.00014 | −1.85567E−07 | 3.08399E−09 |
| S211 | 0 | −0.01096 | −0.00035 | 4.52092E−06 | −1.80461E−08 |
| S213 | 0 | −0.01264 | 0.000342 | −2.62054E−06 | 4.37768E−10 |

Table 6 shows the parameters and condition values for conditions (1)-(7) in accordance with the lens assembly 2 of the second preferred embodiment. It can be seen from Table 6 that the lens assembly 2 of the second preferred embodiment satisfies the conditions (1)-(7).

TABLE 6

| fG1 | 18.30 mm | fG2 | −43.02 mm | fG3 | −20.37 mm |
|---|---|---|---|---|---|
| β | 1.43028 | βr | 1.67284 | BFL | 13.88 mm |
| LG1L | 11.69 mm | | | | |
| fG1/f | 0.42 | fG2/f | −0.98 | fG3/f | −0.47 |
| (1 − β) × βr | −0.72 | f/BFL | 3.15 | TTL/LG1L | 3.18 |

In addition, the lens assembly 2 of the second preferred embodiment can meet the requirements of optical performance as seen in FIGS. 8-12. It can be seen from FIG. 8 that the longitudinal aberration in the lens assembly 2 of the second preferred embodiment ranges from −0.01 mm to 0.04 mm. It can be seen from FIG. 9 that the field curvature of tangential direction and sagittal direction in the lens assembly 2 of the second preferred embodiment ranges from −0.03 mm to 0.04 mm. It can be seen from FIG. 10 that the distortion in the lens assembly 2 of the second preferred embodiment ranges from 0% to 1.5%. It can be seen from FIG. 11 that the lateral color in the lens assembly 2 of the second preferred embodiment ranges from −1 μm to 0 μm. It can be seen from FIG. 12 that the transverse aberration in the lens assembly 2 of the second preferred embodiment ranges from −8 μm to 8 μm. It is obvious that the longitudinal aberration, the field curvature, the distortion, the lateral color, and the transverse aberration of the lens assembly 2 of the second preferred embodiment can be corrected effectively. Therefore, the lens assembly 2 of the second preferred embodiment is capable of good optical performance.

A detailed description of a lens assembly in accordance with a third preferred embodiment of the invention is as follows. Referring to FIG. 13, the lens assembly 3 includes a first lens group LG31, a stop ST3, a second lens group LG32, and a third lens group LG33, all of which are arranged in order from an object side to an image side along an optical axis OA3. The first lens group LG31 includes a 1-1 lens L31, a 1-2 lens L32, a 1-3 lens L33, a 1-4 lens L34, and a 1-5 lens L35, all of which are arranged in order from the object side to the image side along the optical axis OA3. The second lens group LG32 includes a 2-1 lens L36 and a 2-2 lens L37, both of which are arranged in order from the object side to the image side along the optical axis OA3. The third lens group LG33 includes a 3-1 lens L38. In operation, a light from the object side is imaged on an image plane IMA3.

According to the foregoing, wherein: the 1-3 lens L33 is a meniscus lens, wherein the image side surface S35 is a concave surface; the 1-4 lens L34 is made of plastic material; the 2-1 lens L36 is a meniscus lens, wherein the object side surface S311 is a convex surface; and the 3-1 lens L38 is made of glass material. With the above design of the lenses, the lens assembly 3 can have an effective shortened total lens length, an effective increased resolution, an effective corrected aberration, and an effective corrected chromatic aberration.

Table 7 shows the optical specification of the lens assembly 3 in FIG. 13.

TABLE 7

Effective Focal Length = 43.79 mm F-number = 3.9
Total Lens Length = 36.45 mm Field of View = 7.406 degrees

| Surface Number | Radius of Curvature (mm) | Thickness (mm) | Nd | Vd | Effective Focal Length (mm) | Remark |
|---|---|---|---|---|---|---|
| S31 | 19.48 | 2.99 | 1.5 | 81.6 | 18.3 | L31 |
| S32 | −16.26 | 1.00 | 1.8 | 29.8 | −19.6 | L32 |
| S33 | 559.65 | 0.05 | | | | |
| S34 | 12.60 | 2.02 | 1.5 | 81.6 | 28.0 | L33 |
| S35 | 124.61 | 1.05 | | | | |
| S36 | 32.25 | 1.00 | 1.54 | 56.1 | −50.8 | L34 |
| S37 | 11.11 | 1.24 | | | | |
| S38 | 40.83 | 1.43 | 1.62 | 25.9 | 23.2 | L35 |
| S39 | −17.96 | 0.05 | | | | |
| S310 | ∞ | 0.95 | | | | ST2 |
| S311 | 457.19 | 1.00 | 1.54 | 56.1 | −18.9 | L36 |
| S312 | 12.58 | 0.45 | | | | |
| S313 | 22.53 | 1.02 | 1.62 | 25.9 | 36.5 | L37 |
| S314 | −41.20 | 6.39 | | | | |
| S315 | 22.64 | 1.00 | 1.69 | 31.1 | −19.2 | L38 |
| S316 | 8.25 | 14.81 | | | | |

The definition of aspheric surface sag z of each aspheric lens in Table 7 is the same as that of in Table 1, and is not described here again. In the third preferred embodiment, the conic constant k and the aspheric coefficients A, B, C, D of each aspheric lens are shown in Table 8.

TABLE 8

| Surface Number | k | A | B | C | D |
|---|---|---|---|---|---|
| S36 | 0 | 0.010361 | 1.4761E−05 | −8.30673E−08 | −3.32145E−09 |
| S38 | 0 | −0.00512 | −0.000137497 | −1.68072E−07 | 5.71922E−09 |
| S311 | 0 | −0.01026 | −0.000264951 | 5.33791E−06 | −4.59331E−08 |
| S313 | 0 | −0.01214 | 0.000270358 | −4.13744E−06 | 3.09943E−08 |

Table 9 shows the parameters and condition values for conditions (1)-(7) in accordance with the lens assembly 3 of the third preferred embodiment. It can be seen from Table 9 that the lens assembly 3 of the third preferred embodiment satisfies the conditions (1)-(7).

TABLE 9

| fG1 | 17.47 mm | fG2 | −41.52 mm | fG3 | −19.25 mm |
|---|---|---|---|---|---|
| β | 1.43139 | Br | 1.75154 | BFL | 14.81 mm |
| LG1L | 10.77 mm | | | | |
| fG1/f | 0.40 | fG2/f | −0.95 | fG3/f | −0.44 |
| (1 − β) × βr | −0.76 | f/BFL | 2.96 | TTL/LG1L | 3.38 |

In addition, the lens assembly 3 of the third preferred embodiment can meet the requirements of optical performance as seen in FIGS. 14-18. It can be seen from FIG. 14 that the longitudinal aberration in the lens assembly 3 of the third preferred embodiment ranges from −0.01 mm to 0.03 mm. It can be seen from FIG. 15 that the field curvature of tangential direction and sagittal direction in the lens assembly 3 of the third preferred embodiment ranges from −0.02 mm to 0.03 mm. It can be seen from FIG. 16 that the distortion in the lens assembly 3 of the third preferred embodiment ranges from 0% to 1.5%. It can be seen from FIG. 17 that the lateral color in the lens assembly 3 of the third preferred embodiment ranges from −1 μm to 0 μm. It can be seen from FIG. 18 that the transverse aberration in the lens assembly 3 of the third preferred embodiment ranges from −8 μm to 8 μm. It is obvious that the longitudinal aberration, the field curvature, the distortion, the lateral color, and the transverse aberration of the lens assembly 3 of the third preferred embodiment can be corrected effectively. Therefore, the lens assembly 3 of the third preferred embodiment is capable of good optical performance.

To the all of the embodiments, the material of the lens can be benefit to these embodiments to achieve the functions said above.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
 a first lens group which is with positive refractive power and comprises at least four lenses arranged in order from an object side to an image side along an optical axis, among which the lens closest to the object side comprises a convex surface facing the object side, and the lens closest to the image side comprises a convex surface facing the image side;

a second lens group which is with negative refractive power and comprises a 2-1 lens and a 2-2 lens, wherein the 2-2 lens comprises a convex surface facing the image side; and a third lens group which is with negative refractive power and comprises a 3-1 lens, wherein the 3-1 lens is a meniscus lens with negative refractive power;

wherein the first lens group, the second lens group, and the third lens group are arranged in order from the object side to the image side along the optical axis;

wherein the 2-1 lens and the 2-2 lens are arranged in order from the object side to the image side along the optical axis;

wherein the second lens group can move along the direction perpendicular to the optical axis; and the third lens group can move along the optical axis;

wherein the lens closest to the object side is with positive refractive power.

2. The lens assembly as claimed in claim 1, wherein:
at least three of the lenses of the first lens group are with positive refractive power;
the refractive power of the 2-1 lens is opposite to the refractive power of the 2-2 lens; and
at least one of the 2-1 lens and the 2-2 lens of the second lens group is a meniscus lens when at least two of the lenses of the first lens group are meniscus lenses.

3. The lens assembly as claimed in claim 1, wherein:
the first lens group comprises a 1-1 lens, a 1-2 lens, a 1-3 lens, a 1-4 lens, and a 1-5 lens, wherein the 1-1 lens, the 1-2 lens, the 1-3 lens, the 1-4 lens, and the 1-5 lens are arranged in order from the object side to the image side along the optical axis.

4. The lens assembly as claimed in claim 3, wherein:
the 1-4 lens is with negative refractive power.

5. The lens assembly as claimed in claim 4, wherein:
the surface shape of the object side surface of the 2-1 lens is different from that of the image side surface of the 1-3 lens, the surface shape of the image side surface of the 1-3 lens is concave when the surface shape of the object side surface of the 2-1 lens is convex, and the surface shape of the image side surface of the 1-3 lens is convex when the surface shape of the object side surface of the 2-1 lens is concave.

6. The lens assembly as claimed in claim 4, wherein:
the 1-3 lens is with positive refractive power;
the 2-1 lens is with negative refractive power;
the 2-1 lens is a biconcave lens and comprises a concave surface facing the object side and another concave surface facing the image side when the 1-3 lens is a biconvex lens and comprises a convex surface facing the object side and a convex surface facing the image side; and
the 2-1 lens is a meniscus lens when the 1-3 lens is a meniscus lens.

7. The lens assembly as claimed in claim 6, wherein:
the 1-3 lens comprises a convex surface facing the object side and a concave surface facing the image side when the 1-3 lens is a meniscus lens; and
the 2-1 lens comprises a convex surface facing the object side and a concave surface facing the image side when the 2-1 lens is a meniscus lens.

8. The lens assembly as claimed in claim 4, wherein:
the 1-1 lens is a biconvex lens with positive refractive power and comprises a convex surface facing the object side and another convex surface facing the image side;

the 1-2 lens is a biconcave lens with negative refractive power and comprises a concave surface facing the object side and another concave surface facing the image side;

the 1-4 lens is a meniscus lens with negative refractive power and comprises a convex surface facing the object side and a concave surface facing the image side;

the 1-5 lens is a biconvex lens with positive refractive power and comprises a convex surface facing the object side and another convex surface facing the image side; and the 2-2 lens is a biconvex lens with positive refractive power and further comprises another convex surface facing the object side.

9. The lens assembly as claimed in claim 4, wherein the lens assembly satisfies at least one of following conditions:

$$0.35 \leq fG1/f \leq 0.45;$$

$$-1.2 \leq fG2/f \leq -0.85;$$

$$-0.5 \leq fG3/f \leq -0.4;$$

$$Vd4 > Vd5;$$

$$-0.92 \leq (1-\beta) \times \beta r \leq -0.7;$$

$$2 \leq f/BFL \leq 4;$$

$$2.8 \leq TTL/LG1L \leq 3.9;$$

wherein fG1 is an effective focal length of the first lens group, fG2 is an effective focal length of the second lens group, fG3 is an effective focal length of the third lens group, f is an effective focal length of the lens assembly, Vd4 is an Abbe number of the 1-4 lens, Vd5 is an Abbe number of the 1-5 lens, β is a magnification of the second lens group, βr is a magnification of the third lens group, BFL is an interval from an image side surface of a lens closest to the image side of the third lens group to an image plane along the optical axis, TTL is an interval from an object side surface of a lens closest to the object side of the first lens group to the image plane along the optical axis, and LG1L is an interval from the object side surface of the lens closest to the object side of the first lens group to an image side surface of a lens closest to the image side of the first lens group along the optical axis.

10. The lens assembly as claimed in claim 1, wherein:
a 1-4 lens of the first lens group is with negative refractive power; and
the surface shape of the object side surface of the 2-1 lens is different from that of the image side surface of a 1-3 lens of the first lens group, the surface shape of the image side surface of the 1-3 lens is concave when the surface shape of the object side surface of the 2-1 lens is convex, and the surface shape of the image side surface of the 1-3 lens is convex when the surface shape of the object side surface of the 2-1 lens is concave.

11. The lens assembly as claimed in claim 1, wherein:
the first lens group comprises a 1-1 lens, a 1-2 lens, a 1-3 lens, a 1-4 lens, and a 1-5 lens;
the 3-1 lens comprises a convex surface facing the object side and a concave surface facing the image side; and
the 1-1 lens, the 1-2 lens, the 1-3 lens, the 1-4 lens, and the 1-5 lens are arranged in order from the object side to the image side along the optical axis.

12. The lens assembly as claimed in claim 1, wherein:
a 1-1 lens of the first lens group is a biconvex lens with positive refractive power and comprises a convex surface facing the object side and another convex surface facing the image side;
a 1-2 lens of the first lens group is a biconcave lens with negative refractive power and comprises a concave surface facing the object side and another concave surface facing the image side;
a 1-4 lens of the first lens group is a meniscus lens with negative refractive power and comprises a convex surface facing the object side and a concave surface facing the image side;
a 1-5 lens of the first lens group is a biconvex lens with positive refractive power and comprises a convex surface facing the object side and another convex surface facing the image side; and
the 2-2 lens is a biconvex lens with positive refractive power and further comprises another convex surface facing the object side.

13. The lens assembly as claimed in claim 1, further comprising a stop disposed between the first lens group and the second lens group.

14. The lens assembly as claimed in claim 1, wherein the lens assembly satisfies at least one of following conditions:

$0.35 \leq fG1/f \leq 0.45;$ $-1.2 \leq fG2/f \leq -0.85;$ $-0.5 \leq fG3/f \leq -0.4;$ $Vd4 > Vd5;$ $-0.92 \leq (1-\beta) \times \beta r \leq -0.7;$ $2 \leq f/BFL \leq 4;$ $2.8 \leq TTL/LG1L \leq 3.9;$ wherein fG1 is an effective focal length of the first lens group, fG2 is an effective focal length of the second lens group, fG3 is an effective focal length of the third lens group, f is an effective focal length of the lens assembly, Vd4 is an Abbe number of a 1-4 lens of the first lens group, Vd5 is an Abbe number of a 1-5 lens of the first lens group, β is a magnification of the second lens group, βr is a magnification of the third lens group, BFL is an interval from an image side surface of a lens closest to the image side of the third lens group to an image plane along the optical axis, TTL is an interval from an object side surface of a lens closest to the object side of the first lens group to the image plane along the optical axis, and LG1L is an interval from the object side surface of the lens closest to the object side of the first lens group to an image side surface of a lens closest to the image side of the first lens group along the optical axis.

15. A lens assembly comprising:
a first lens group which is with positive refractive power and comprises at least four lenses arranged in order from an object side to an image side along an optical axis, among which the lens closest to the object side comprises a convex surface facing the object side, and the lens closest to the image side comprises a convex surface facing the image side;
a second lens group which is with positive negative refractive power and comprises a 2-1 lens and a 2-2 lens, wherein the 2-2 lens comprises a convex surface facing the image side; and
a third lens group which is with negative refractive power and comprises a 3-1 lens, wherein the 3-1 lens is a meniscus lens with negative refractive power;
wherein the first lens group, the second lens group, and the third lens group are arranged in order from the object side to the image side along the optical axis;
wherein the 2-1 lens and the 2-2 lens are arranged in order from the object side to the image side along the optical axis
wherein the first lens group comprises a 1-1 lens, a 1-2 lens, a 1-3 lens, a 1-4 lens, and a 1-5 lens, wherein the 1-1 lens, the 1-2 lens, the 1-3 lens, the 1-4 lens, and the 1-5 lens are arranged in order from the object side to the image side along the optical axis;
wherein the 1-4 lens is with negative refractive power and the 1-5 lens is with positive refractive power;
wherein the 1-4 lens is second closest to the image side and the 1-5 lens is closest to the image side in the first lens group.

16. The lens assembly as claimed in claim 15, wherein:
the second lens group can move along the direction perpendicular to the optical axis; and the third lens group can move along the optical axis.

17. The lens assembly as claimed in claim 16, wherein:
the 1-4 lens is with negative refractive power;
the surface shape of the object side surface of the 2-1 lens is different from that of the image side surface of the 1-3 lens, the surface shape of the image side surface of the 1-3 lens is concave when the surface shape of the object side surface of the 2-1 lens is convex, and the surface shape of the image side surface of the 1-3 lens is convex when the surface shape of the object side surface of the 2-1 lens is concave.

18. The lens assembly as claimed in claim 16, wherein:
the 1-1 lens is a biconvex lens with positive refractive power and comprises a convex surface facing the object side and another convex surface facing the image side;
the 1-2 lens is a biconcave lens with negative refractive power and comprises a concave surface facing the object side and another concave surface facing the image side;
the 1-4 lens is a meniscus lens with negative refractive power and comprises a convex surface facing the object side and a concave surface facing the image side;
the 1-5 lens is a biconvex lens with positive refractive power and comprises a convex surface facing the object side and another convex surface facing the image side; and
the 2-2 lens is a biconvex lens with positive refractive power and further comprises another convex surface facing the object side.

19. The lens assembly as claimed in claim 16, wherein the lens assembly satisfies at least one of following conditions:

$0.35 \leq fG1/f \leq 0.45;$ $-1.2 \leq fG2/f \leq -0.85;$ $-0.5 \leq fG3/f \leq -0.4;$ $Vd4 > Vd5;$ $-0.92 \leq (1-\beta) \times \beta r \leq -0.7;$ $2 \leq f/BFL \leq 4$;

$2.8 \leq TTL/LG1L \leq 3.9$;

wherein fG1 is an effective focal length of the first lens group, fG2 is an effective focal length of the second lens group, fG3 is an effective focal length of the third lens group, f is an effective focal length of the lens assembly, Vd4 is an Abbe number of the 1-4 lens, Vd5 is an Abbe number of the 1-5 lens, β is a magnification of the second lens group, βr is a magnification of the third lens group, BFL is an interval from an image side surface of a lens closest to the image side of the third lens group to an image plane along the optical axis, TTL is an interval from an object side surface of a lens closest to the object side of the first lens group to the image plane along the optical axis, and LG1L is an interval from the object side surface of the lens closest to the object side of the first lens group to an image side surface of a lens closest to the image side of the first lens group along the optical axis.

20. A lens assembly comprising:

a first lens group which is with positive refractive power and comprises at least four lenses arranged in order from an object side to an image side along an optical axis, among which the lens closest to the object side comprises a convex surface facing the object side, and the lens closest to the image side comprises a convex surface facing the image side;

a second lens group which is with negative refractive power and consisting of a 2-1 lens and a 2-2 lens, wherein the 2-2 lens comprises a convex surface facing the image side; and a third lens group which is with negative refractive power and consisting of a 3-1 lens, wherein the 3-1 lens is a meniscus lens with negative refractive power;

wherein the first lens group, the second lens group, and the third lens group are arranged in order from the object side to the image side along the optical axis;

wherein the 2-1 lens and the 2-2 lens are arranged in order from the object side to the image side along the optical axis wherein the first lens group consisting of a 1-1 lens, a 1-2 lens, a 1-3 lens, a 1-4 lens, and a 1-5 lens, wherein the 1-1 lens, the 1-2 lens, the 1-3 lens, the 1-4 lens, and the 1-5 lens are arranged in order from the object side to the image side along the optical axis.

* * * * *